United States Patent [19]
Westerberg

[11] Patent Number: 5,478,986
[45] Date of Patent: Dec. 26, 1995

[54] METHOD AND APPARATUS FOR MAKING POPCORN USING ELECTRON AND MOLECULAR EXCITATION MODE

[75] Inventor: Eugene R. Westerberg, Palo Alto, Calif.

[73] Assignee: Quadlux, Inc., Fremont, Calif.

[21] Appl. No.: 229,478

[22] Filed: Apr. 19, 1994

Related U.S. Application Data

[63] Continuation-in-part of Ser. No. 738,207, Jul. 30, 1991, which is a continuation-in-part of Ser. No. 664,494, Mar. 5, 1991, which is a continuation-in-part of Ser. No. 195,967, May 19, 1988, abandoned, said Ser. No. 738,207is a continuation-in-part of Ser. No. 350,024, May 12, 1989, Pat. No. 5,036,179.

[51] Int. Cl.⁶ .................................................. F27B 9/06
[52] U.S. Cl. ............................ 219/411; 219/405; 99/331
[58] Field of Search ...................................... 219/405, 409, 219/411, 285, 388, 391; 99/323.9, 331, 341; 426/235, 237, 302; 392/416, 418

[56] References Cited

U.S. PATENT DOCUMENTS

| | | | |
|---|---|---|---|
| 3,280,720 | 10/1966 | Kuhn | 99/323.9 |
| 3,882,255 | 5/1975 | Gorham, Jr. et al. | 426/235 |
| 4,455,479 | 6/1984 | Itoh et al. | 219/405 |
| 4,554,437 | 11/1985 | Wagner et al. | 219/388 |
| 4,575,616 | 3/1986 | Bergendal | 219/405 |
| 5,036,179 | 7/1991 | Westerberg et al. | 219/411 |

Primary Examiner—Tu Hoang
Attorney, Agent, or Firm—Limbach & Limbach; George C. Limbach

[57] ABSTRACT

An oven using one or more quartz halogen tungsten lamps or quartz arc bulbs capable of producing radiant energy of which a significant portion is in the visible light range of the electromagnetic spectrum to pop popcorn whereby visible and near visible radiation directly impinges onto corn kernels. Radiation sources can be positioned around the corn kernels and the inner walls of the oven are preferably highly reflective to reflect light energy onto the kernels. The kernels travel down a tube shaped cooking chamber by a forced air stream. When the corn pops, the highly reflective and very light popped corn is removed via the air stream which stops the cooking process.

13 Claims, 1 Drawing Sheet

METHOD AND APPARATUS FOR MAKING POPCORN USING ELECTRON AND MOLECULAR EXCITATION MODE

CROSS REFERENCES TO RELATED APPLICATIONS

This application is a continuation-in-part of U.S. patent application Ser. No. 738,207 filed on Jul. 30, 1991, which was (1) a continuation-in-part of U.S. patent application Ser. No. 664,494 filed on Mar. 5, 1991, which was a continuation in part of U.S. patent application Ser. No. 195,967 filed on May 19, 1988, (now abandoned), and (2) a continuation-in-part of U.S. patent application Ser. No. 07/350,024 filed on May 12, 1989, now U.S. Pat. No. 5,036,179, which are incorporated herein by reference.

FIELD OF THE INVENTION

This invention relates to a cooking method and apparatus, and more particularly, to a method and apparatus for cooking corn kernels to produce "popcorn", which is corn kernels that have exploded under intense heat buildup within the kernel. The method and apparatus produce popcorn substantially faster and eliminate burning as compared to the conventional methods and apparatus for cooking corn kernels.

BACKGROUND OF THE INVENTION

Ovens for cooking and baking food have been known and used for thousands of years. Basically, oven types can be categorized in four different forms. The simplest and probably the oldest cooking resulted when man put some vegetable or grain products on a hot rock next to a fire, and cooked them essentially by the heat transfer method of conduction. With a little more refinement, an enclosure surrounding the heating element entrapped the heated air giving rise to cooking by convective heat transfer. This was the prototype for the modern gas or electric oven. In the past century, radiant energy from infrared radiation sources has been used to heat and cook foodstuffs directly. Within the past few decades, microwave radiation has proved useful in allowing very short cooking times for many types of food.

There are subtle differences between cooking and baking. Cooking just requires the heating of the food. Baking of a product from a dough, such as bread, cake, crust, or pastry, requires not only heating of the product throughout but also a chemical reaction coupled with driving the water from the dough in a predetermined fashion to achieve the correct consistency of the final product and finally browning the outside. Following a recipe when baking is very important. An attempt to decrease the baking time in a conventional oven by increasing the temperature results in a damaged or destroyed product.

In general, there are problems when one wants to cook or bake foodstuffs with high-quality results in the shortest times. Conduction and convection provide the necessary quality, but both are inherently slow energy transfer methods. Long wave infrared radiation can provide faster heating rates, but it only heats the surface area of most foodstuffs, leaving the internal heat energy to be transferred by much slower conduction. Microwave radiation heats the foodstuff very quickly in depth, but during baking the loss of water near the surface stops the heating process before any satisfactory browning occurs. Consequently, microwave ovens cannot produce quality baked foodstuffs, such as bread.

Just as with baking, there are drawbacks with the conventional methods of popping corn. To pop "popcorn", the kernels must be heated so that internal heat buildup cause the kernel to explode. Once the kernel has exploded, it is desireable for the cooking process to stop.

One conventional method of popping corn is to heat the kernels on a hot surface. There are drawbacks to this method. First, heating surface affects a small volume of the kernels; the spot on the kernel that contacts the hot surface. Second, the "husk" (outer surface) of the kernel tends to burn on the spot that contacts the hot surface. Once the kernel has popped, the popped kernel, including the attached husk, continues to burn on the spot that contacts the hot surface because the popped kernels are not separated from the unpopped kernels. The burned spots give the popcorn an undesirable burn taste.

To help alleviate this problem, one may shake or constantly stir the popped and unpopped kernels. Additionally, the heated surface temperature may be reduced. And finally, the cooking process can be stopped before all the kernels are popped. The result is that there still is a burn taste, the process is slow, and not all the kernels are popped leaving waste kernels mixed in with the popped kernels.

Another conventional method to cook the kernels is to use hot oil. This tends to speed up the heat transfer to the kernel and provide a more uniform application of heat to the kernel. While this process addresses spot burning, cooking with oil has its disadvantages. Hot oil can still burn the popcorn if the oil is too hot or if the kernel takes too long to pop. Further, it leaves an undesirable residue on the popcorn that carries the burn taste from burned kernels to the popped corn. Finally, the popped kernels continue to cook after popping.

A third method of popping corn is by the use of an oven. Conventional ovens, however, can't transfer heat to the inside of the kernel fast enough to be speed efficient. And the problems of overcooking the popped corn and the presence of wasted unpopped kernels are still present.

Microwave popping corn addresses the most predominant problem of popping corn: speed. But still, the problems of spot burning, overcooking of the husk and popped corn, and leftover unpopped kernels are still present. Additionally, microwave popping of corn is hard to do in mass quantities, such as in movie theaters.

Hot air popping machines, which cook the kernels with swirling hot air, address the spot burning problem. The popped corn, however, still swirls in hot air after popping so overcooking is still a problem. And as always, the speed is never sufficient.

There is a need for a very fast method of cooking popping corn that does not spot burn, does not continue to cook the corn once it is popped, does not leave a residue on the popped corn, and does not leave leftover unpopped (waste) kernels intermixed with the popped corn.

SUMMARY OF THE INVENTION

The present invention is an oven for the high-speed, high-quality cooking of popcorn which includes a means for impinging high-intensity visible and near-visible radiations onto popcorn kernels. The radiation produced by electric lamps cooks the kernels at accelerated rates comparable to microwave cooking, while preventing corn kernels that have popped from overcooking and/or burning by removing the popped corn from the unpopped kernels by means of an air flow.

The corn kernel molecules themselves have very definite bands of absorption in both the visible and near-visible regions. In the visible region this absorption shows up as food color. For example, tomatoes absorb all of the blue and green components of the white light that illuminates them, and they reflect the red portion back to the eye. Hence we see a "red" tomato. This color absorption is due to the excitation of specific electrons that make up the molecules in a particular foodstuff, and it is this absorption that makes it possible to use intense visible and near-visible radiation to heat the foodstuff molecules directly. The low absorption of visible and near-visible radiation allows the energy to penetrate the corn kernel and heat it deeply and very quickly. The longer wavelengths of light (infrared region) does not penetrate the kernel, so it cooks just the husk of the corn only.

Using intense visible and near-visible radiation to cook popcorn has a number of significant advantages. First of all, the cooking process is very fast. Even with all of the infrared radiation removed, the corn will start to pop in times as short as 15 seconds, which is many times faster than hot air or microwave poppers. Second, the quality of the cooking process is enhanced for cooking popcorn. For example, there are no burn spots from hot surfaces or oil residue left on the popped corn. Also, when the corn pops, it becomes a very low absorbing, highly scattering white color which automatically terminates the radiant heating. Third, the process is very energy efficient. Because the oven has reflective inner walls, most of the energy produced by the sources is used to cook the corn rather than heat the oven. A batch of corn can be fully popped for about $0.005 (½ cent) of electrical energy.

Ordinarily, in the preferred oven configuration, the visible and near-visible impinging means is one or more quartz-halogen tungsten lamps, or equivalent means such as quartz arc lamps. Typical quartz-halogen lamps of this type, operating at 3000 degrees Kelvin, convert electrical energy into black body radiation having a range of wavelengths from 0.4 µm to 4.5 µm with a peak intensity at 0.965 µm. Each lamp can generally provide from 1 to 2 KW of radiant energy with a significant portion of the energy in the visible light spectrum.

For cooking popcorn, it is desirous not to cook or brown the outside husk during the cooking process. Therefore, the present invention has a means for blocking the infrared spectrum from the lamps, leaving only visible and near-visible radiation impinging the popcorn.

Typical configurations can use one to as many as ten lamps operated in unison, and larger ovens could use even more lamps. One or more of the radiation source lamps may be used in the cooking process as necessary. These radiation sources are ordinarily positioned above and below, or around the corn. The walls of the surrounding corn chamber are preferably treated to be highly reflective to this radiation. The visible and infrared waves from the radiation sources impinge directly on the corn and are also reflected on this inner surface of the oven to strike the corn many times from many angles. This reflecting action results in a greater uniformity of cooking, and since very little of the radiation is absorbed in the surrounding reflecting surface, almost all of the radiant energy is converted into heat upon and within the corn. Hence, this process is a very efficient mode of transferring energy to the corn for cooking, and operation is very economical.

The intensity of the radiation from the lamps is controllable. Each lamp can be individually controlled or the lamps can be operated in unison to provide the desired cooking result. It is necessary that this control be performed quickly, because of the inherent speed of the cooking process. For certain corn products, it may be necessary that the intensity be varied throughout the cooking cycle. Such fast and variable intensity control is preferably managed through automatic means, such as computer or microprocessor circuits.

DETAILED DESCRIPTION OF THE PREFERRED EMBODIMENT

Figure 1:
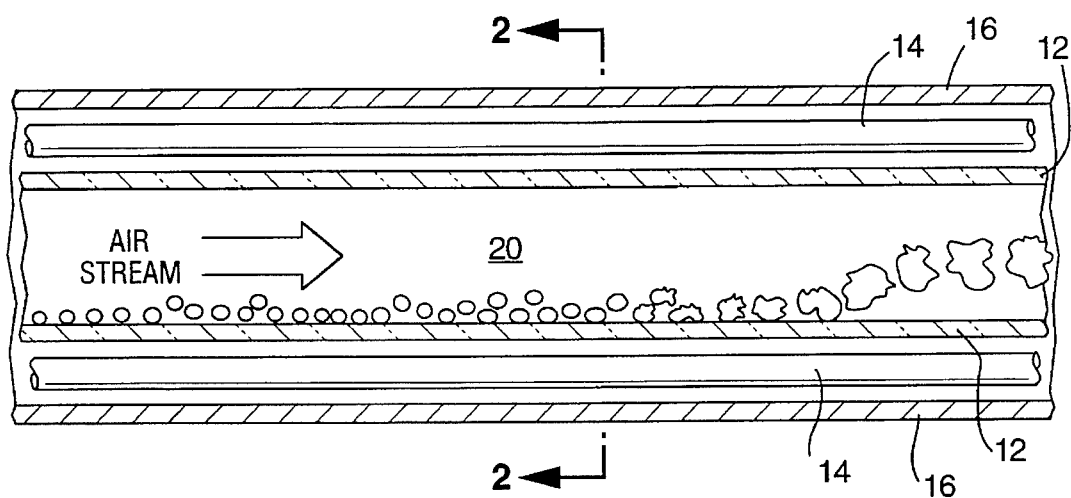
FIG. 1 shows a partial side cross section of a preferred embodiment of the present invention.
Figure 2:
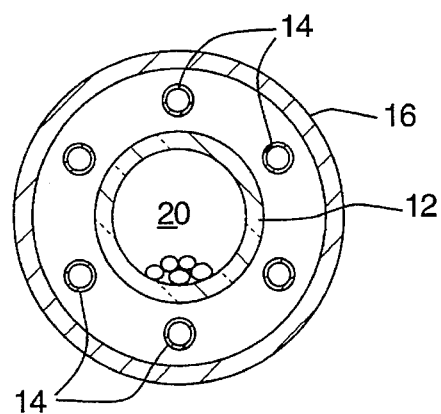
FIG. 2 is a crossectional view of the structure of FIG. 1 taken along the line 2—2 in the direction of the arrows.

FIG. 1 is a front cross section of the preferred embodiment of the present invention. The oven in FIG. 1 includes an elongated radiation chamber 20 defined by a transmissive tube 12, radiation heating lamps 14, and an outer reflective housing 16.

The transmissive tube 12 allows radiation from the lamps 14 to enter the cooking chamber 20. The transmissive tube 12 can be formed from such materials as quartz or a glass that transmits visible and non-visible radiations.

The energy for cooking is supplied by the radiation heating lamps 14. These lamps are generally any of the quartz body, tungsten-halogen or quartz arc lamps commercially available, e.g., 1.5 KW 208 V quartz-halogen lamps. The oven according to the preferred embodiment utilizes six such lamps where approximately 40% to 50% of the energy is in the visible and near-visible light portion of the spectrum. Quartz xenon-krypton arc lamps have been used as an alternate source in which 95% of the radiation is below 1 µm and good cooking results have been achieved with their shorter wavelengths.

There is no precise definition for the range of wavelengths for visible light because the perceptive ranges of each human eye is different. Scientific definitions typically encompass the range of 0.39 µm to 0.77 µm. An engineering shorthand for visible light specifies the range of 0.4 µm to 0.7 µm. The term near-visible has been coined for radiation that has wavelengths longer than the visible range, but less than the water absorption cut-off at 1.35 µm.

Because the process of popping corn kernels does not require any browning process, the longer wavelengths of radiation emitted from the lamps needs to be removed. Filters can be inserted in front of the lamps so as to allow only visible and near visible radiation to impinge the tube 12. Alternatively, the tube 12 itself can contain a filter film or be made of filter material that will not transmit infrared radiation. Finally, a water filled shield could be placed outside the tube. The water would absorb all the longer wavelengths and allow the visible and near visible radiation to pass through.

The preferred embodiment has a housing 16 that is a circular tube shaped reflector which surrounds the tube 12 and the lamps 14. The inner surface of the housing 16 is preferably a highly polished and poorly absorptive surface, very reflective to the wide spectrum of wavelengths from the radiant lamps. Polished aluminum and stainless steel have been successfully used for the inner wall of housing 16. The reflective surface of the inner wall of the housing 16 is such that almost all the radiation from the lamps impinging the housing 16 is redirected back toward the cooking chamber 20.

There is an air flow means, such as a fan, that creates an air stream within the chamber 20. The air flow serves two purposes. First, the air flow carries corn kernels inserted into the upwind side of the chamber 20 slowly down the tube 12. This constant movement of the kernels ensures even radiation exposure. Secondly, the air flow quickly removes the popped corn as soon as it pops.

To aid the air flow in carrying the kernels down the length of tube 20, the preferred embodiment has the tube 20 oriented so it is not quite horizontal. The upwind end of tube 20 is slightly higher than the downwind end, thus creating a slightly downward slope for the path of the kernels as they travel down tube 20. In addition, or in the alternative, the tube 20 can be vibrated to assist the air flow in carrying the kernels down the length of the tube 20.

During operation, the lamps 14 illuminate the chamber 20 with powerful visible and near-visible radiation. Any radiation passing through the chamber 20 impinges the reflective housing and is redirected back into the chamber 20. The kernels are inserted into the upwind end the chamber. The air stream causes the kernels to travel down the chamber 20. As they travel, the kernels are evenly radiated with the visible and near visible radiation.

The length of the chamber and the energy of the lamps are selected such that before the kernels reach the end of tube 12, they pop, resulting in two effects. First, the color of the popped corn turns to a low light absorbing white, which effectively stops the cooking process. Second, the popped corn's volume to weight ratio increases drastically. With the new high volume to weight ratio, the popped corn is accelerated drastically by the air stream and quickly removed from the chamber 20, thus preventing any further undesired cooking.

It is possible to control the lamps 14 independently with a control circuit. The control circuit may include a microprocessor or a microcontroller and associated memory to store individual cooking recipes to control proper heating of the corn.

The physical characteristics of an operative embodiment of the present invention includes a chamber 2 inches in diameter and 8 inches long with an air stream of 10 feet per second passing therethrough. Six lamps each operating with 2 Kw of power are positioned longitudinally around the chamber 20.

The energy efficiency of the present invention is illustrated by the fact that the energy cost to cook 1 bag of popped corn is a fraction of one cent. The majority of the radiant energy produced by the oven is utilized in cooking the corn and after the cooking process is completed the energy is turned off. In contrast, conventional commercial popcorn poppers must be preheated to desired cooking temperatures. Ordinarily, a popcorn popper in a movie theater is left on all day, whether popping corn or not, making the energy consumption significant.

The benefits of this invention are numerous. First, the corn is evenly cooked as it passes down tube 12, which prevents spot burning. Second, all the corn is popped before it is removed from the chamber 20. Third, the corn is quickly removed just after it pops, eliminating overcooking or further spot burning and effectively separating the popped and unpopped corn. Fourth, the invention is energy efficient because all the energy is directed to the corn and the invention is turned off between uses. Fifth, it is clean because no oils or other materials are required to aid the cooking process. And finally, the biggest advantage is the speed of cooking. The invention is so fast that a movie theater can pop the corn right into a patrons cup, and then instantly turn the oven off until the next patron arrives. The end result is very good quality popcorn popped to order fresh for each patron or group of patrons.

The present invention was described in relation to a preferred embodiment. However, it will be apparent to one skilled in the art that one can change the parameters and still practice an invention within the spirit and scope of the present invention.

I claim:

1. A method of popping kernels of corn comprising the steps of:

moving corn kernels by an air stream in an elongated radiation chamber and impinging radiant energy onto the kernels in said chamber, the radiant energy including a significant portion of energy in the near visible and visible ranges whereby when the kernels pop and their volume to weight ratio increases drastically the popped kernels are accelerated by the air stream out of said chamber.

2. The method of claim 1 wherein the moving step includes moving the kernels along a substantially horizontal axis.

3. The method of claim 1 wherein the moving step includes vibrating said elongated radiation chamber.

4. The method of claim 2 wherein the moving step includes vibrating said elongated radiation chamber.

5. The method of claim 1 including the step of filtering out energy in the infrared range from the radiant energy directed to the kernels.

6. The method of claim 1 wherein said impinging step includes impinging the kernels with radiant energy from a plurality of directions around said radiation chamber.

7. Apparatus for popping kernels of corn comprising, in combination:

an elongated radiation chamber having an input end and an output end, air stream means for creating an air stream to move corn kernels in said radiation chamber toward said output end, means for injecting corn kernels in the air stream, and means for impinging radiant energy onto the kernels in said chamber, the radiant energy including a significant portion of energy in the near visible and visible ranges;

wherein the radiant energy impinging onto the kernels has sufficient intensity that before the kernels reach the output end of said chamber they have received sufficient radiation to pop whereby the volume to weight ratio of the kernels increases drastically and the popped kernels are accelerated by the air stream out of said chamber.

8. The apparatus of claim 7 wherein said elongated radiation chamber has its longer axis in a substantially horizontal direction.

9. The apparatus of claim 7 further comprising:

means for vibrating, said radiation chamber.

10. The apparatus of claim 8 further comprising:

means for vibrating said radiation chamber.

11. The apparatus of claim 7 including means for filtering out energy in the infrared range from the radiant energy impinged onto the kernels.

12. The apparatus of claim 7 wherein said impinging means includes means for directing radiant energy to the kernels from a plurality of directions within said radiation chamber.

13. The apparatus of claim 7 including means surrounding said chamber for reflecting radiant energy back into said chamber.

* * * * *